United States Patent [19]

Rothermel

[11] Patent Number: 5,124,866
[45] Date of Patent: Jun. 23, 1992

[54] RECORDING HEAD CORE YOKE WITH FULL LENGTH CORE SUPPORT

[75] Inventor: Stephen J. Rothermel, Roseville, Minn.

[73] Assignee: Minnesota Mining and Manufacturing Company, St. Paul, Minn.

[21] Appl. No.: 473,329

[22] Filed: Feb. 1, 1990

[51] Int. Cl.⁵ .................. G11B 5/48; G11B 21/16; G11B 5/127
[52] U.S. Cl. .................... 360/104; 360/125
[58] Field of Search ............ 360/104, 125, 123, 103

[56] References Cited

U.S. PATENT DOCUMENTS

| | | | |
|---|---|---|---|
| 3,692,255 | 9/1972 | Von Behren | 242/192 |
| 4,300,179 | 11/1981 | Barnes et al. | 360/127 |
| 4,313,143 | 1/1982 | Zarr | 360/106 |
| 4,686,596 | 8/1987 | Kraemer et al. | 360/126 |
| 4,926,274 | 5/1990 | Saitoh | 360/103 |

Primary Examiner—A. J. Heinz
Attorney, Agent, or Firm—Gary L. Griswold; Walter N. Kirn; Charles D. Levine

[57] ABSTRACT

A yoke for supporting a magnetic recording core adjacent a moving recording tape is disclosed. The core has two major surfaces, two side walls, and upper and lower walls. Two wound wire coils are mounted to the core adjacent respective side walls and extend beyond the major surfaces. The yoke includes two opposed major surfaces and a front surface which defines a bearing surface for supporting the recording tape. A narrow slot is formed in the front surface to receive the core. The walls of the narrow slot stabilize the core along the length of the core adjacent the core upper wall. Relief pockets extend between the two major surfaces of the yoke and encompass at least a portion of the narrow slot. The relief pockets permit winding the coils around the core after the core is positioned in the yoke.

16 Claims, 2 Drawing Sheets

RECORDING HEAD CORE YOKE WITH FULL LENGTH CORE SUPPORT

TECHNICAL FIELD

The present invention relates to a yoke for supporting a magnetic recording head core in a recording and playing device. More particularly, the present invention relates to a recording head core yoke with improved support for the core adjacent its upper wall.

BACKGROUND OF THE INVENTION

Belt driven reel to reel tape cartridges and tape drives adapted for their use are disclosed in U.S. Pat. No. 3,692,255, issued to Von Behren. In the Von Behren cartridge the tape extends between the reels along a tape path across a cutaway portion of the cartridge for access to a transducer or recording head which is part of the tape drive. A driving belt contacts the tape on the reels to bi-directionally drive the tape, including rapid accelerations and decelerations, such as are encountered in digital data recording and playback.

U.S. Pat. No. 4,313,143 discloses a head positioning mechanism for a Von Behren cartridge recorder which positions a recording head core transversely of the magnetic tape to record data in a series of parallel tracks. U.S. Pat. No. 4,300,179 discloses a recording head core yoke for a Von Behren cartridge recorder which carries the recording head core and supports the magnetic tape transversely of its direction of movement. However, recent developments in reduced recording track spacing require a smaller recording head core and greater lateral support for this core. Smaller video recording cores have a thin body including two major surfaces, opposed ends, a curved upper wall, and two wound wire coils adjacent the ends. These cores can provide the required parallel recording track densities if the core is rigidly supported. Adequate support is also necessary because the cores are extremely fragile.

U.S. Pat. No. 4,686,596 to Kraemer et al. (the '596 patent) addresses these problems. The '596 patent discloses a recording head core yoke in which a narrow slot 36 supports the core along its length adjacent the bottom wall of the core and a perpendicular thin slot 58 supports the core along its depth. The thin slot 58 is formed by walls which help to define relief slots 38, 40. The relief slots accommodate wound wire coils while the slots 36, 58 support the core along its length and depth, respectively. However, while this arrangement supports the core along both the length and depth of the core, it is desirable to provide further support. The yoke design of the '596 patent does not provide core support along the length of the upper wall of the core.

SUMMARY OF THE INVENTION

Support for a video recording core along the upper wall is provided by a supporting yoke according to the present invention. The yoke includes two opposed major surfaces and a front surface which defines a bearing surface for supporting the recording tape transversely of its direction of movement. A narrow slot is formed in the front surface perpendicular to the bearing surface for receiving the core. The walls forming the narrow slot contact the core along substantially the entire length of the upper wall of the core to stabilize the core. The support yoke may be formed as a single molded or machined structure or may be a laminate structure.

A relief pocket extends along both major surfaces of the yoke and encompasses a portion of the narrow slot. Each relief pocket extends into one major surface of the yoke for a distance parallel to the direction of tape movement less than one half of the distance between the two major surfaces of the yoke. The portion of the yoke between the two relief pockets includes walls which form the narrow slot for the core and contact the core along substantially the entire depth of the core. Each relief pocket extends from a point above the bottom of the narrow slot to a point below the bearing surface. The width of each relief pocket transverse to the direction of tape movement is sufficient to receive wound wire coils which are mounted on the core and to permit the coils to be wound around the core after the core is disposed in the yoke.

In a further modification, front surface relief slots are disposed on the front surface of the yoke, one on each side of the narrow core slot. These relief slots have a bottom wall disposed below the front surface of the yoke and the core upper wall to permit the core to contact the tape with the proper pressure when the tape moves past the core.

DETAILED DESCRIPTION OF PREFERRED EMBODIMENTS

Figure 1:
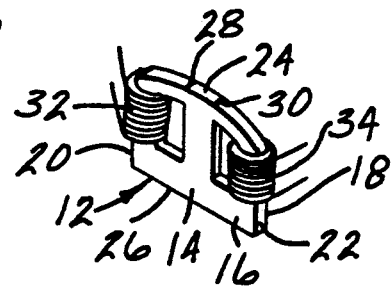
FIG. 1 is a perspective view of a video recording head core.

FIG. 1 illustrates a conventional video recording head core 12 for a magnetic data tape cartridge. A video recording head core is compatible with data tape cartridge drives and is used because of its low cost. The core 12 to be used is preferably a dual-gap core, although a single-gap core, triple-gap core, or any other known core also can be used. The recording core 12 is constructed of a highly permeable ferromagnetic material. A magnetic ferrite such as manganese zinc ferrite or nickel zinc ferrite is typically used. The core 12 includes a thin, generally rectangular body portion 14 having two major surfaces 16, 18, opposed side walls 20, 22, a curved upper wall 24, and a straight lower wall 26. The upper wall 24 includes two magnetic gaps 28, 30, one for writing or recording and one for reading or playing back recorded material, although the gaps 28, 30 may combine these tasks, along with erasing, differently. The magnetic gaps 28, 30 may simply be slots open to the air, or they may be filled with glass, conductive metals, or other materials. The magnetic flux present at the magnetic gaps 28, 30 is controlled by two wound wire coils 32, 34 which extend beyond the side walls 20, 22, respectively, and which are suitably connected to a recording machine such as a tape drive (not shown). Typically, each coil corresponds to a respective gap. Thus, a single gap core requires only one coil and a triple gap core requires three coils, although additional coils could be used. The length of the core is the distance between the side walls 20 and 22, the width of the core is the distance between the major surfaces 16 and 18, and the depth of the core is the distance between the curved upper wall 24 and the lower wall 26.

Figure 2:
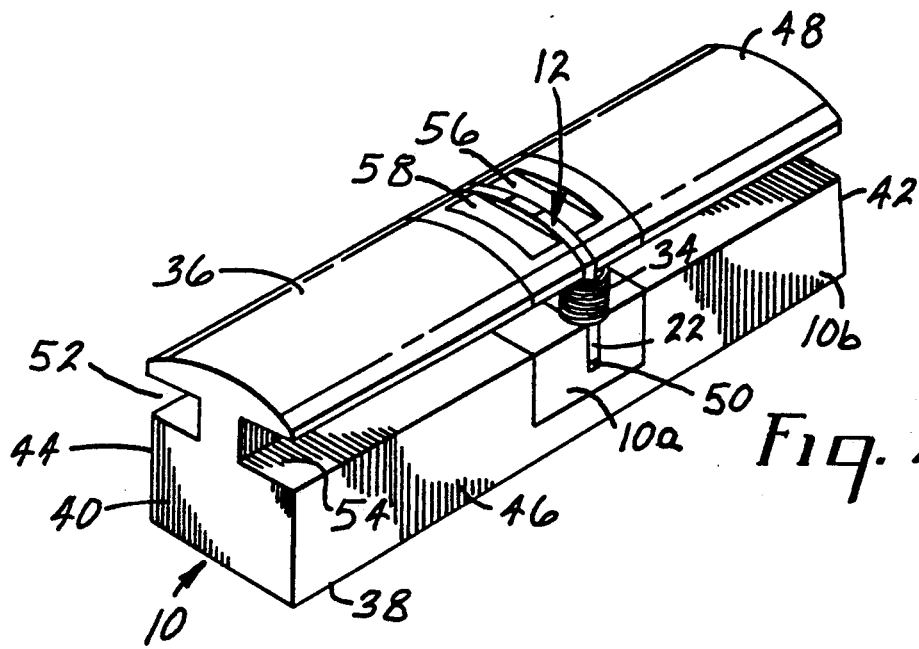
FIG. 2 is a perspective view of a core support yoke according to the present invention with the core of FIG. 1 disposed within the yoke.

FIG. 2 shows the core 12 disposed within a support yoke 10 according to the present invention. The yoke 10 is used in a magnetic data tape drive wherein a magnetic tape moves in a direction parallel to the length direction of the yoke 10 across the core 12. Although different shapes may be used, the yoke 10 is preferably a generally rectangular polyhedron and has a front surface 36 and an opposed rear surface 38. The front surface 36 is curved to correspond to the shape of the curved upper wall 24 of the core 12, although both may be flat. The rounding of the upper wall 24 and the front surface 36 eliminates sharp edges which might abrade or otherwise damage the recording tape. The distance between the front and rear surfaces 36, 38 is defined as the depth of the yoke 10. The yoke 10 also includes two opposed end surfaces 40, 42 which define the width of the yoke 10. Finally, the yoke 10 has two opposed side surfaces 44, 46 which are perpendicular to the end surfaces 40, 42. The distance between the side surfaces 44, 46 is the length of the yoke 10. The front surface 36 of the yoke 10 forms a bearing surface 48 which supports the recording tape as it travels past the recording head core 12 and the yoke 10.

The core 12 is housed within the yoke 10 in a narrow slot 50 formed in a lengthwise direction within the front surface 36 of the yoke 10. The narrow slot 50 is formed by two opposed walls. The width of the narrow slot 50 is selected to correspond to the width of the core 12 so that the walls provide an interference fit with the core 12. In operation, the core 12, secured within the yoke 10, is moved transversely to the direction of tape movement to record a series of spaced, parallel information tracks on the recording tape. Since the core 12 moves transversely to the direction of the recording tape, the bearing surface 48 of the yoke 10 must have a width sufficient to provide support for the entire recording tape width. To accomplish this, when a single core is used, the yoke 10 extends in each direction from the core 12 a distance at least equal to the width of the recording tape. That is, with the core 12 centered in the yoke 10, the width of the yoke 10 is at least twice the width of the recording tape. However, the yoke 10 width can be less when multiple cores 12 are supported.

Figure 3:
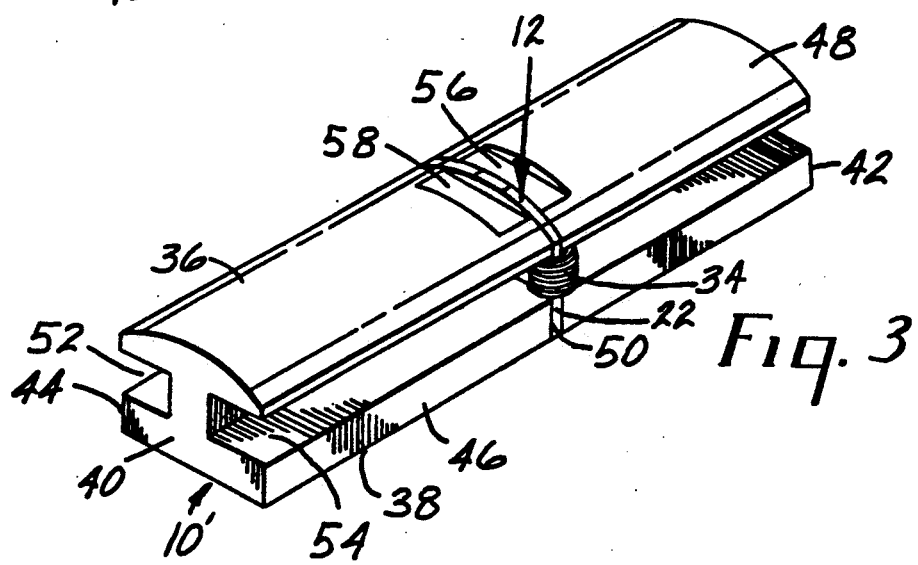
FIG. 3 is a perspective view of an alternate embodiment of a core support yoke according to the present invention.

The yoke 10 of FIG. 2 is formed as one piece. Alternatively, as shown by yoke 10' in FIG. 3, the yoke may be formed in separate sections with the narrow slot 50 being formed by respective end surfaces of the yoke sections. Also, the depth of the yoke 10' is less than that of the yoke 10. Throughout this description, the yoke 10 of FIG. 1 will be used to illustrate the features of the yoke unless the features pertain only to yoke 10', yoke 10'', or yoke 10''' described below.

As shown in FIG. 2, the narrow slot 50 closely accommodates the recording core 12 along the entire length of the core 12 at the upper wall 24 as well as at the lower wall 26. Additionally, the walls of the narrow slot 50 support the core 12 along the entire depth of the core 12 at the center of the core 12. This provides more support for the core 12 near the core recording surface 24 than previous yokes. This also reduces bowing of the tape into the gaps of the core during either reading or writing to prevent mistracking and spacing loss, especially at the edges of the tape.

The yoke 10 also preferably has a pair of open-ended, coil relief slots or pockets 52, 54. The coil relief slots 52, 54 each extend along the entire width of the yoke 10 at a location adjacent the front surface 36 of the yoke 10. When the core 12 is disposed in the yoke 10, each coil relief slot 52, 54 could be said to be formed of two half slots, one on each side of and bordered by the core 12. The coil relief slots 52, 54 encompass a portion of the narrow slot 50. As shown in FIG. 2, the coil relief slots 52, 54 extend from a point located above the bottom of the narrow slot 50, toward the bearing surface 48, and to a point below the bearing surface 48.

The coil relief slots 52, 54 accommodate and provide clearance for respective wire coils 32, 34 and extend for the entire width of the yoke 10 to simplify machining. When only one coil 32 is to be used, only one coil relief slot 52 would be required. Additionally, a plurality of coils could share the same coil relief slot. The width of the coil relief slots 52, 54 permits the coils 32, 34 to be wound around the core 12 after assembly of the core 12 to the yoke 10. In this fashion, the coils 32, 34 do not interfere with the assembly of the core 12 and the yoke 10, and the insulation on the coils 32, 34 is not damaged during assembly. This improves upon known yokes wherein the coils must be wound around the core before assembly with the yoke and may be damaged during assembly. As discussed above, the narrow slot 50 supports the core 12 along the entire length of the core 12 along the upper wall 24. This is accomplished in combination with the coil relief slots 52, 54 and is an improvement over the '596 patent which does not provide this support.

To insure adequate contact between the core 12 and the recording tape, the curved upper wall 24 of the core 12 should extend slightly beyond the bearing surface 48 of the yoke 10. It is preferred that the core 12 project approximately 0.03 mm above the bearing surface 48. To accomplish this, the core 12 may have a depth greater than the depth of the narrow slot 50 or the core 12 may be located with its lower wall 26 spaced from the bottom surface of the narrow slot 50.

In an alternative to this design as shown in FIG. 2, shallow front surface relief slots 56, 58 may be provided in the front surface 36 of the yoke 10 on either side of the narrow slot 50. Using these front surface relief slots 56, 58, which have a bottom wall below the bearing surface 48 of the yoke, instead of extending the core 12 permits the core 12 and yoke 10 to be lapped as one piece. This eliminates many tolerance requirements that can adversely affect the core-to-tape pressure if the yoke 10 or core 12 are imprecisely machined, and simplifies construction of the yoke 10 and core 12 assembly. In using front surface relief slots 56, 58, the yoke 10 may be glass bonded to the core 12 before lapping because the winding and lapping can be conducted after the core 12 and yoke 10 are assembled. Additionally, the reduced penetration of the core 12 into the tape when the front surface relief slots 56, 58 are used allows the recording head to reliably record nearer to the edge of the tape than the '596 patent. As a further modification, the core upper wall 24 can extend beyond the bearing surface 48 in combination with front surface relief slots 56, 58.

Figure 4:
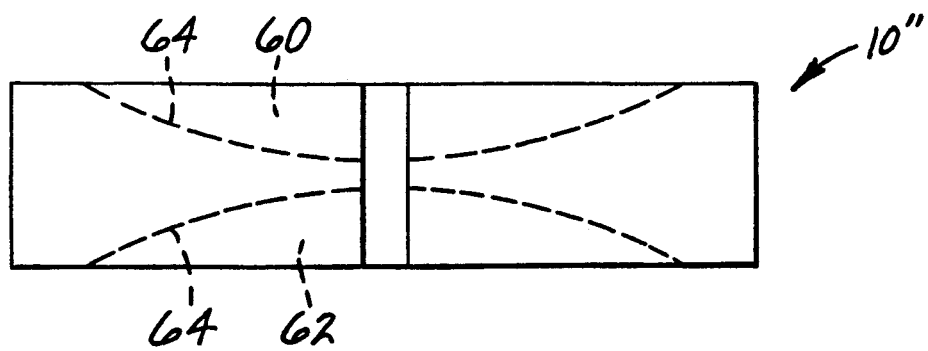
FIG. 4 is a top view of yet another embodiment of a core support yoke of the present invention.

FIG. 4 illustrates an alternate embodiment of the coil relief slots. In this embodiment, each coil relief slot or pocket 60, 62 of yoke 10'' is shaped to direct the coils 32, 34 out of the respective relief slot and away from the yoke 10″. The coil relief slots 60, 62 each have a curved side wall 64 which has a predetermined curve which directs the coils 32, 34 outwardly away from the curved side wall 64 as the coils are wound around the core. This speeds the winding of the coils 32, 34 around the core 12 and improves the quality of the wound coils 32, 34.

Figure 5:
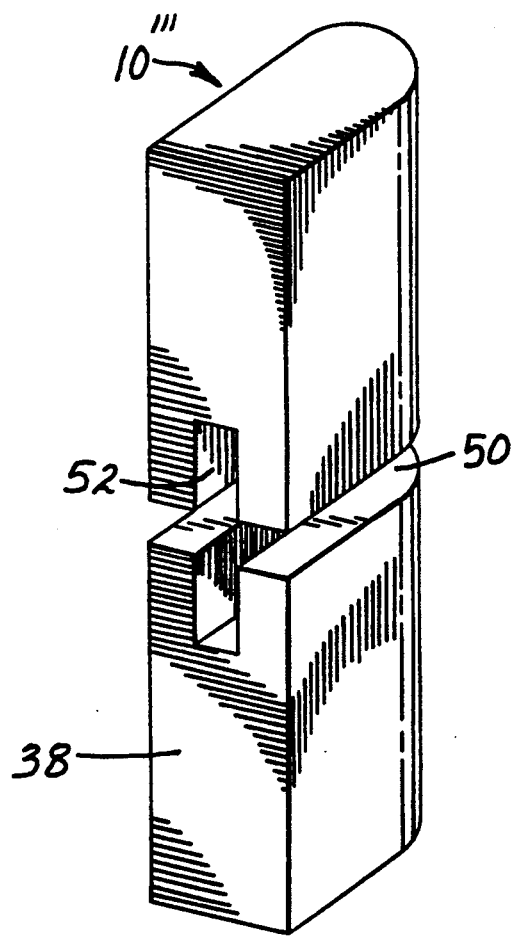
FIG. 5 is a perspective view of still another embodiment of the core support yoke of the present invention.

In an alternate embodiment shown in FIG. 5, a single coil is wrapped around the core 12 at the lower wall 38 of the core 12. In this embodiment, the yoke 10‴ is formed with the core-receiving narrow slot 50 passing completely through the yoke 10‴ as shown. As in the prior embodiments, the yoke 10‴ can be formed either with or without support for the core 12 adjacent the rear surface of the yoke 10‴ along the lower wall of the core 12, and the yoke halves are adhesively or glass bonded together. In this embodiment, one coil relief slot 52 is formed in the rear surface 38 of the yoke 10‴ to accommodate the coil, although multiple coil cores can be used in different configurations of the yoke 10‴ (not shown).

As discussed above, the use of full width coil relief slots 52, 54 allows winding of the coils 32, 34 on the core 12 after the core 12 is installed in the yoke 10. These slots, as well as the front surface relief slots 56, 58 provide many advantages. This yoke 10 and core 12 combination with coil relief slots 52, 54 which extend across the entire yoke width is cheaper to make and easier to machine than a yoke which uses closed slots such as that shown in the '596 patent. The yoke 10 may be machined using more commonly available tools such as a grinding wheel, and the coils do not interfere with the assembly of the core 12 and yoke 10 or their alignment. Additionally, the design of the narrow slot 50 provides much greater support for the core 12 along the entire length of the core 12, particularly along the curved upper wall 24 of the core 12 where support is most critical. This improved core support prevents the recording tape from bowing into the gaps of the core and thereby prevents mistracking and spacing loss. Additionally, although the yoke 10 has been described as supporting one core 12, yokes 10 for supporting a plurality of cores 12 may also be formed.

In the manufacture of the yoke 10 it is possible to form the yoke as a laminated structure (not shown). In this embodiment, the front surface of the yoke may be formed as a separate portion from and laminated to the rest of the yoke. This can be useful when a single coil relief slot (not shown) extends through the entire length of the yoke 10 between the yoke side surfaces. This single relief slot would extend on either side of the walls forming the narrow slot along the depth of the core. While this embodiment provides better core support than known configurations, it does not provide as much support as the configuration with two coil relief slots described above.

Additionally, as shown in FIG. 2, the yoke 10 may be formed of two separate materials. A low permeability material 10a forms the portion of the yoke 10 adjacent the core 12 and a high permeability material 10b forms the remainder of the yoke 10. The material 10a isolates the core 12 from electromagnetic fields in the material 10b. A ceramic, such as barium titanite or calcium titanite, is the preferred low permeability material 10a and ferrite, such as manganese zinc ferrite or nickel zinc ferrite, is the preferred high permeability material 10b.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, the tape drive using the yoke may be an audio cassette recorder, a reel to reel tape recorder, a video cassette recorder, a digital audio tape recorder, or any other tape drive. Additionally, the yoke and its corresponding core may be used with other magnetic recording media such as disks.

I claim:

1. A yoke for supporting at least one magnetic core in proximity to a moving medium, the core having two opposed side walls, a lower wall, and an upper wall connecting the side walls, the yoke comprising:
   two opposed major surfaces spaced a distance apart from each other;
   a front surface connecting the two opposed major surfaces and defining a bearing surface for supporting the medium transversely to the direction of medium movement;
   a narrow slot in the front surface for receiving and stabilizing the core and having a pair of opposed walls and a bottom wall bridging the opposed walls, the opposed walls contacting the core adjacent the upper wall of the core along substantially the entire length of the core between side walls of the core in a direction parallel to the direction of medium movement, and the bottom wall capable of supporting the lower wall of the core; and
   at least one relief pocket formed in at least one of the major surfaces and extending at least part of the distance between the two major surfaces, wherein the relief pocket is sufficiently wide transverse to the direction of medium movement to receive at least one wound wire coil which is associated with the core and wherein the relief pocket encompasses a portion of the narrow slot.

2. A yoke according to claim 1 comprising two relief pockets, wherein each relief pocket extends from a different major surface and the combined extension of the relief pockets between the major surfaces is less than the distance between the two major surfaces.

3. A yoke according to claim 2 wherein both of the opposed walls forming the narrow slot contact the core between the two relief pockets along substantially the entire depth of the core between the upper and lower walls of the core.

4. A yoke according to claim 2 wherein each relief pocket extends away from the narrow slot a distance sufficient to permit each coil associated with the core to be wound around the core after the core is disposed in the narrow slot.

5. A yoke according to claim 4 wherein each relief pocket is shaped to direct the coil windings out of the relief pocket and away from the yoke as the coil is wound to facilitate winding of the coils around the core.

6. A yoke according to claim 5 wherein each relief pocket has curved inner walls.

7. A yoke according to claim 4 wherein the two relief pockets are open at their ends and extend for the entire width of the yoke.

8. A yoke according to claim 1 wherein the yoke is a generally rectangular polyhedron, and the pair of opposed walls forming the narrow slot are perpendicular to the bearing surface.

9. A yoke according to claim 1 wherein both of the opposed walls forming the narrow slot contact the core along substantially the entire depth of the core between the upper and lower walls of the core for at least a portion of the length of the core.

10. A yoke according to claim 1 wherein both of the opposed walls forming the narrow slot contact the core adjacent the lower wall of the core along substantially the entire length of the core.

11. A yoke for supporting at least one magnetic core in proximity to a moving medium, the core having two opposed side walls, a lower wall, and an upper wall connecting the side walls, the yoke comprising:
two opposed major surfaces spaced a distance apart from each other;
a front surface connecting the two opposed major surfaces and defining a bearing surface for supporting the medium transversely to the direction of medium movement;
a pair of opposed walls forming a narrow slot in the front surface for receiving and stabilizing the core, the opposed walls contacting the core adjacent the upper wall of the core along substantially the entire length of the core between side walls of the core in a direction parallel to the direction of medium movement; and
two relief pockets, wherein each relief pocket extends from a different major surface and the combined extension of the relief pockets between the major surfaces is less than the distance between the two major surfaces, wherein each relief pocket encompasses a portion of the narrow slot, each relief pocket extends from the narrow slot in the direction transverse to the direction of medium movement sufficiently to receive at least one wound wire coil which is associated with the core and to permit each coil to be wound around the core after the core is disposed in the narrow slot, and each relief pocket has curved inner walls to direct the coil windings out of the relief pocket and away from the yoke as the coil is wound to facilitate winding the coils around the core.

12. A yoke for supporting at least one magnetic core in proximity to a moving medium, the core having two opposed side walls, a lower wall, and an upper wall connecting the side walls, the yoke comprising:
two opposed major surfaces spaced a distance apart from each other;
a front surface connecting the two opposed major surfaces and defining a bearing surface for supporting the medium transversely to the direction of medium movement;
a pair of opposed walls forming a narrow slot in the front surface for receiving and stabilizing the core, the opposed walls contacting the core adjacent the upper wall of the core along substantially the entire length of the core between side walls of the core in a direction parallel to the direction of medium movement;
at least one relief pocket formed in at least one of the major surfaces and extending at least part of the distance between the two major surfaces, wherein the relief pocket is sufficiently wide transverse to the direction of medium movement to receive at least one wound wire coil which is associated with the core and wherein the relief pocket encompasses a portion of the narrow slot; and
two front surface relief slots, wherein each relief slot is disposed on an opposite side of the narrow slot such that when the core is positioned within the narrow slot the bottom wall of each front surface relief slot is disposed below the bearing surface and below the core upper wall to increase pressure between the core and the medium when the medium moves past and contacts the core.

13. A yoke for supporting at least one magnetic core in proximity to a moving medium, the core having two opposed side walls, a lower wall, and an upper wall connecting the side walls, the yoke comprising:
two opposed major surfaces;
a front surface connecting the two opposed major surfaces and defining a bearing surface for supporting the medium transversely of medium movement;
a rear surface connecting the two opposed major surfaces opposite the front surface;
a pair of opposed walls forming a narrow slot in the front surface for receiving and stabilizing the core, the opposed walls contacting the core adjacent the upper wall of the core along substantially the entire length of the core between side walls of the core in a direction parallel to the direction of medium movement; and
a relief pocket extending into the yoke from the rear surface, wherein the relief pocket is dimensioned transverse to the direction of medium movement an amount sufficient to receive at least one wound wire coil associated with the core.

14. A yoke according to claim 13 wherein the relief pocket dimension transverse to the direction of medium movement is sufficient to permit each coil associated with the core to be wound around the core after the core is disposed in the narrow slot.

15. A yoke for supporting at least one magnetic core in proximity to a moving medium, the core having two opposed side walls, a lower wall, and an upper wall connecting the side walls, the yoke comprising:
two opposed major surfaces spaced a distance apart from each other;
a front surface connecting the two opposed major surfaces and defining a bearing surface for supporting the medium transversely to the direction of medium movement;
a pair of opposed walls forming a narrow slot in the front surface for receiving and stabilizing the core, the opposed walls contacting the core adjacent the upper wall of the core along substantially the entire length of the core between side walls of the core in a direction parallel to the direction of medium movement, wherein the core upper wall is disposed above the bearing surface of the yoke to increase the pressure between the core and the medium when the medium moves past and contacts the core; and
at least one relief pocket formed in at least one of the major surfaces and extending at least part of the distance between the two major surfaces, wherein the relief pocket is sufficiently wide transverse to the direction of medium movement to receive at least one wound wire coil which is associated with the core and wherein the relief pocket encompasses a portion of the narrow slot.

16. A yoke according to claim 10 wherein the core depth between upper and lower walls of the core is larger than the depth of the narrow slot.

* * * * *